(12) United States Patent
Tomlinson

(10) Patent No.: US 6,367,420 B1
(45) Date of Patent: Apr. 9, 2002

(54) APPARATUS FOR PREVENTING SCATTERED CAT LITTER

(76) Inventor: Lyla Tomlinson, 244 N. Allumbaugh #212, Boise, ID (US) 83704

(*) Notice: Subject to any disclaimer, the term of this patent is extended or adjusted under 35 U.S.C. 154(b) by 0 days.

(21) Appl. No.: 09/650,713

(22) Filed: Aug. 29, 2000

Related U.S. Application Data

(63) Continuation-in-part of application No. 09/197,244, filed on Nov. 20, 1998, now Pat. No. 6,109,211.

(51) Int. Cl.[7] .................................................. A01K 1/01
(52) U.S. Cl. .................................................. 119/165
(58) Field of Search ........................... 119/165, 166, 119/167, 168

(56) References Cited

U.S. PATENT DOCUMENTS

| | | | |
|---|---|---|---|
| 3,246,630 A | 4/1966 | Dearing et al. | 119/1 |
| 3,618,568 A | 11/1971 | Breeden | 119/482 |
| 3,885,523 A | 5/1975 | Coleman | 119/1 |
| 4,029,048 A | * 6/1977 | Gershbein | 119/165 |
| 4,838,202 A | 6/1989 | Neu | 119/1 |
| 5,042,430 A | 8/1991 | Casmira | 119/165 |
| 5,165,366 A | 11/1992 | Harvey | 119/165 |
| 5,195,464 A | 3/1993 | Mutter | 119/165 |
| 5,218,930 A | * 6/1993 | Casmira | 119/165 |
| 5,220,886 A | 6/1993 | Hyde | 119/165 |
| 5,329,878 A | 7/1994 | McCauley | 119/165 |
| D351,693 S | 10/1994 | Sutton | D30/161 |
| D351,694 S | 10/1994 | Evans | D30/161 |
| 5,361,725 A | 11/1994 | Baillie et al. | 119/165 |
| 5,388,550 A | 2/1995 | Noble | 119/165 |
| 5,601,052 A | 2/1997 | Rood et al. | 119/165 |
| 5,676,090 A | 10/1997 | Cannady, Jr. | 119/165 |
| 5,701,844 A | 12/1997 | Murphy | 119/165 |
| 5,713,302 A | 2/1998 | Walter | 119/165 |
| 5,769,026 A | 6/1998 | Kohn | 119/165 |
| 5,797,352 A | 8/1998 | Ebert | 119/652 |
| 5,887,546 A | 3/1999 | Gruel | 119/165 |
| 5,893,336 A | 4/1999 | Vice et al. | 119/165 |
| 5,992,350 A | 11/1999 | Manzo | 119/165 |

* cited by examiner

*Primary Examiner*—Michael J. Carone
*Assistant Examiner*—Yvonne R. Abbott
(74) *Attorney, Agent, or Firm*—Ken J. Pedersen; Barbara S. Pedersen

(57) ABSTRACT

An apparatus for preventing litter from being scattered upon the floor outside the litter box and beyond, whether strewn by the cat during or after using the litter box, or by the owner when cleaning the litter box. The present invention comprises an enclosure having a front side, a left side, a right side and a base. The present invention is designed to encourage the cat to step out of a litter box and into a tracked litter receptacle for collecting tracked litter. The front side, or the left and/or right sides near the front side of the enclosure, has/have portal(s) allowing a cat to step into the enclosure. The present invention is further designed to corral not only litter tracked on the bottom of the cats paws, but litter tossed, flipped and spilled out of the litter box. There are many benefits to the present invention including: reduced mess outside the litter box and beyond; reduced grit on hard floors; reduced destruction of carpeting; reduced effort, time and frequency of clean-up; ease of use and handling; ease of emptying; improved aesthetics; and improved sanitation.

18 Claims, 8 Drawing Sheets

APPARATUS FOR PREVENTING SCATTERED CAT LITTER

DESCRIPTION

This application is a continuation-in-part of my prior, application, Ser. No. 09/197,244, entitled "Apparatus for Preventing Scattered Cat Litter," filed Nov. 20, 1998, and issuing on Aug. 29, 2000 as U.S. Pat. No. 6,109,211, which is hereby incorporated by reference.

BACKGROUND OF THE INVENTION

1. Field of the Invention

The present invention generally relates to domesticated pets. More specifically, the present invention relates to litter box accessories for domesticated cats.

2. Related Art

The use of cat litter as a defecation substrate in litter boxes has been widely used for decades. However, the major drawback with the use of cat litter has been the unwanted transfer of cat litter out of the litter box and onto the surrounding floors. Such transfer occurs in a variety of ways, including (1) litter tossed out of the litter box while the cat robustly digs with its paws in the litter box, (2) litter that gets between the toes and upon the hairs of the cat that is then transferred when the cat flips or shakes its paws to rid them of attached litter, or when the cat walks away from the litter box, and (3) cat litter that the owner of the cat drops outside the litter box as the owner cleans the litter box.

The result of this tracking, flipping, tossing and spilling is an unsightly area surrounding the litter box, grit under human foot if the floor surface is hard, tracking of cat litter throughout the pet owner's house by human and pet foot traffic, and possible staining and destruction of a carpeted floor surface. Litter deposited outside the litter box is often tracked by pet or human foot traffic to other parts of the home, resulting in further sanitation problems.

This tracking problem has been exasperated in recent years with the invention and increased use of clumping cat litter. The particulate size of individual pieces of clumping cat litter are much smaller and finer than traditional "non-clumping" cat litter, thereby resulting in an increased amount of tracking as greater numbers of the smaller particles of clumping litter are able to be carried and flipped out of the litter box by the cat.

The unsightly, gritty, and unsanitary litter scattered outside the litter box is cause for much human aggravation and has been coped with unsuccessfully by the use of a variety of devices. Some of these devices have been designed to catch only the litter tracked on the bottoms of paws and do nothing to corral litter strewn about by other means. Some of these devices are so easy for the cat to avoid stepping on or in that they are essentially ineffective. Other inventions have been cumbersome in appearance and difficult to empty.

Furthermore, these prior art devices have done little, if anything, to control the mess incurred during litter box clean-up. Prior art methods of coping with the mess have involved manual and frequent sweeping, vacuuming, scrubbing and the like.

Many devices have been invented for the reduction and elimination of the tracking problem. For instance: both U.S. Pat. No. 3,246,630 (Dearing, et al.) and U.S. Pat. No. 3,885,523 (Coleman) disclose a "sanitary facility for animals" comprising litter boxes having a built-in screen upon which a cat walks to dislodge cat litter from the cat's paws. Other inventions disclose apparatuses causing the cat to walk across a grated or screened surface to remove cat litter from the cats' paws. See U.S. Pat. No. 5,042,430 (Casmira); U.S. Pat. No. 5,195,366 (Harvey); U.S. Pat. No. 5,195,464 (Mutter); U.S. Pat. No. 5,220,886 (Hyde); U.S. Pat. No. 5,388,550 (Noble); and U.S. Pat. No. 5,361,725 (Baillie, et aL).

Another device, U.S. Pat. No. 4,838,202 (Neu) discloses an "animal litter container" comprising a five-sided box into which a litter box is placed. The Neu invention also is intended to be "easily accessible through both the top and one or more of the sides."

Other patents disclose litter boxes having sloped surfaces for the removal of cat litter from cat's paws. For instance, U.S. Pat. No. 5,676,090 (Canady, Jr.) discloses a "scatter-resistant litter box" having a sloped front compartment with a sloped, carpeted surface for the removal of cat litter from cat's paws; and U.S. Pat. No. 5,713,302 (Walter) discloses a "pet waste containment system" alternatively having a sloped, ramp for the collection of litter.

Another U.S. Pat. No. 5,769,026 (Kohn) discloses an enclosure for a litter box having carpeted pathways for the removal of cat litter from cats' paws.

Another U.S. Pat. No. 5,797,352 (Ebert) discloses a paw cleaning litter mat for placing outside the front of a litter box for the removal of cat litter from cats' paws.

Two design patents, U.S. Pat. No. Des. 351,693 (Sutton) and U.S. Pat. No. Des. 351,693 (Evans), show other methods of collecting tracked litter, each comprising trays set in front of the litter box.

However, none of these patents disclose an enclosure for a litter box that is so simple, and yet is effective in many ways: that has an entrance that directs the cat in such a way that litter-retention inside the enclosure is optimized; that catches litter scattered by a variety of means, from being tracked on the bottom of paws and spilled from the litter box, to being flipped and tossed by the cat's paws; that is adjustable in the combined size of the litter box and apparatus; is easy to empty by merely picking the apparatus up, tilting to the side and pouring into a container; that is lightweight; that is low maintenance; that adds to the aesthetic appearance of the litter box area; that provides a work area in which to clean the litter box without spilling or dropping litter on the surrounding floor; that greatly reduces the frequency that the surrounding area must be cleaned; that provides increased sanitation for the home; and that is used in combination with an existing litter box to make that litter box more efficient.

SUMMARY OF THE INVENTION

The present invention is an apparatus for corralling cat litter before it can be scattered outside the litter box. The present invention comprises a enclosure having a front side wall, a left side wall, a right side wall, and a base. The enclosure preferably does not have a back side wall. The enclosure has a portal, preferably in the front wall or in one or both side walls near the front wall, allowing a cat to step into and out of the invented enclosure.

The preferred enclosure is adapted to cooperate with a conventional covered, one-opening cat litter box. The length and width of the enclosure is such that all approaches to the litter box, except the intended side of the litter box with its front opening, are relatively inaccessible to the cat. This feature encourages the cat to use the invented enclosure properly. Thus, there is preferably relatively less space between the enclosure side walls and the side walls of the litter box, compared to space between the front wall of the enclosure and the front opening of the litter box. Still, there may be some space between the enclosure side walls and the litter box sidewalls to give some leeway in the fit between the enclosure and the litter box for variously-sized litter boxes. For example, a single enclosure may be sized to fit with two sizes of litter box, wherein using the smaller of the two litter boxes may result in slightly more space between the litter box and the sidewalls of the enclosures.

The present invention is used by sliding or setting a standard-sized cat litter box into the enclosure formed by the three upright walls of the present invention. The litter box must be so positioned within the enclosure so that a cat entering the enclosure through the portal at or near the front of the enclosure can enter the litter box. It is preferred that enough room will be between the front side of the enclosure and the front of the litter box so that the cat can stand with all four paws outside the litter box but within the enclosure. However, if the enclosure is alternatively sized so that the cat is only able to place one paw at a time within the enclosure, the enclosure is still beneficial.

The ideal litter box position is having the front side of the litter box just inside the open back of the enclosure. However, if available space for the litter box is too small to accommodate the ideal, fully-extended litter box-enclosure combination, the litter box can be moved forward inside the present enclosure, toward the front side of the enclosure, reducing the overall size of the combination. Enough space should be left between the front of the litter box and the portal of the enclosure, which is at the front enclosure wall (in the front wall) or near the front enclosure wall (in either side wall), so that the cat will step into the enclosure upon exiting the litter box, rather than jumping directly from inside the litter box to the floor outside the enclosure.

Upon using the litter box and exiting the litter box, the cat steps within the invented enclosure. Such stepping results in the dislodging of cat litter particles from the paws of the cat. These litter particles are deposited on the floor of the present enclosure instead of being tracked out of the enclosure. Most cats do not like the feel of litter adhered to their paws, so they tend to shake and flip their paws to remove the litter. This litter, dislodged when the cat shakes and flips its paws, is sent through the air, hits the walls of the enclosure and falls back to the floor of the enclosure, and is so contained away from the room's floor area. Then, when the cat steps out of the invented enclosure, the amount of cat litter tracked is considerably less than the amount of cat litter that would be tracked out of a litter box that is not surrounded by the invented enclosure.

The present invention may be further used by the pet owner during cleaning of the litter box. The pet owner puts a trash container on the floor of the enclosure in front of the litter box. The caretaker reaches into the litter box, scoops litter clumps, lifts the clumps up, and deposits the clumps into the container. Litter spilled from the litter scoop during this process falls to the floor of the enclosure and is so contained away from the surrounding room floor.

To empty the enclosure, the pet owner moves the litter box backward out of the enclosure, picks up the enclosure, tilts it to the side, and pours the collected cat litter into a chosen container, such as a trash can.

There are many benefits to the present invention beyond the main benefit of reducing the tracking of cat litter outside of the litter box. A second benefit is the reduction of human aggravation associated with stepping on grit outside the litter box, the sight of litter outside the litter box, and the inability to keep the area free of litter without frequent sweeping, vacuuming, and scrubbing.

A third benefit is that the invented enclosure improves aesthetics of the cat litter area. For instance, the tracking of cat litter is unsightly to home owners, and eliminating or decreasing the amount of cat litter tracked into other areas of the home makes the home more attractive. Also, the enclosure serves to screen the litter box partially from view, thereby improving the appearance of the area in which the litter box is located.

A fourth benefit is reduced maintenance and labor. As the pet owner "scoops" the waste clumps out of the litter box, cat litter particles that are dropped in such a cleaning process fall within the enclosure, allowing for easy clean-up. Also, by reducing the area in which cat litter is tracked, the time necessary to clean-up such tracking is greatly reduced. For example, clean-up of tracked litter is as simple as removing the litter box from the enclosure, tilting enclosure to one side to cause all of the loose litter to form into a pile, and then tilting the enclosure over a trash can to cause the piled litter to drop into the trash can. The pet owner does not need to come into contact with the litter. Alternatively, the owner may pour the tracked litter back into the litter box for reuse. Because the enclosure catches both tracked litter and litter tossed through the air by the cat, the frequency of clean-up to the area surrounding the litter box is decreased drastically.

A fifth benefit of the present invention is health, safety and sanitation. By reducing or eliminating tracked litter through the home, the home becomes more healthy and safe, for instance, by reducing the risk of allergy or disease that may be associated with used litter or cat feces.

A sixth benefit of the present invention is ease of use and handling. The present invention is preferably of a one-piece design, eliminating the need for assembly. The present invention, whether it is in one-piece or other design, preferably has no mechanical parts. The present invention is also of lightweight design, allowing use by individuals of differing size and strength. Operation is simple and easy to understand.

A seventh benefit of the present invention is forcing the cat to place all four paws within the present invention upon exiting the litter box. Many devices in the prior art are made in shapes and sizes that allow the cat to step through or over them with as little as one footstep. For maximum effectiveness, the cat needs to step into a device with all four paws, and the present enclosure encourages this behavior.

An eighth benefit of the present invention is the ability to use the present invention with the litter box already owned by the cat owner. Many of the devices found in the prior art include a litter box, thus making them usable only to cat owners willing to purchase a new litter box plus the device. In contrast, the enclosure is preferably an accessory to a standard litter box, thereby allowing the enclosure to be useable by not only those wishing to purchase a new litter box system, but by those already owning a litter box. The efficiency of a conventional litter box is greatly enhanced by the invented enclosure, thereby broadening the market greatly.

A ninth benefit of the present invention is the ability to catch litter both tracked and airborne litter. Many devices in the prior art attempt to stop litter either tracked litter or airborne litter, but not both.

A tenth benefit of the present invention is size adjustability. The combined size of the litter box and enclosure can be reduced or extended, depending on the wishes and needs of the user. The reduced-size combination offers valuable benefits for use in an apartment or small area where the ideal, fully-extended combination is not usable, thereby making the enclosure usable by more groups of cat owners.

An eleventh benefit of the present invention is that it is preferably a stackable or foldable design, decreasing wholesale and retail storage space and decreasing shipping costs.

DESCRIPTION OF THE PREFERRED EMBODIMENTS

Figure 1:
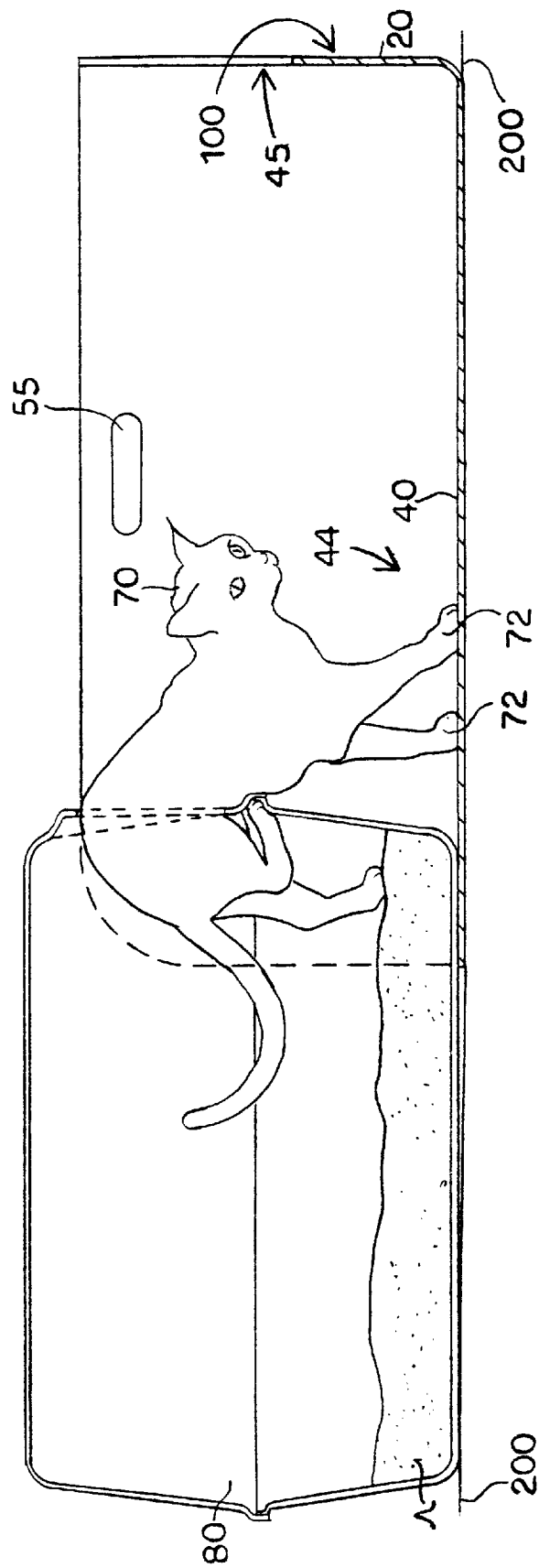
FIG. 1 is a left side, cross-sectional view of the preferred embodiment of the invented device, holding a litter box and being used by a cat.

As shown in the Figures, the present invention is an enclosure for corralling airborne and tracked cat litter 100. The present invention comprises an enclosure 100 having a front side wall 20, a left side wall 60, a right side wall 50 and a base or bottom side 40 for receiving a litter box 80 filled with litter A. The preferred enclosure 100 preferably does not have a back side wall.

As shown in FIG. 1, the base 40 is preferably a horizontal, rectangular piece, having two shorter sides and two longer sides. The base 40 preferably is a planar, flat, level surface, having no recessed portions, except, optionally, recesses that will not interfere with removal of the litter box from the enclosure and will not interfere with removal of the tracked litter from the enclosure. For example, longitudinal recess (es) or upending ridges from front to back may be acceptable, while transverse recesses or ridges typically are not acceptable.

Figure 4:
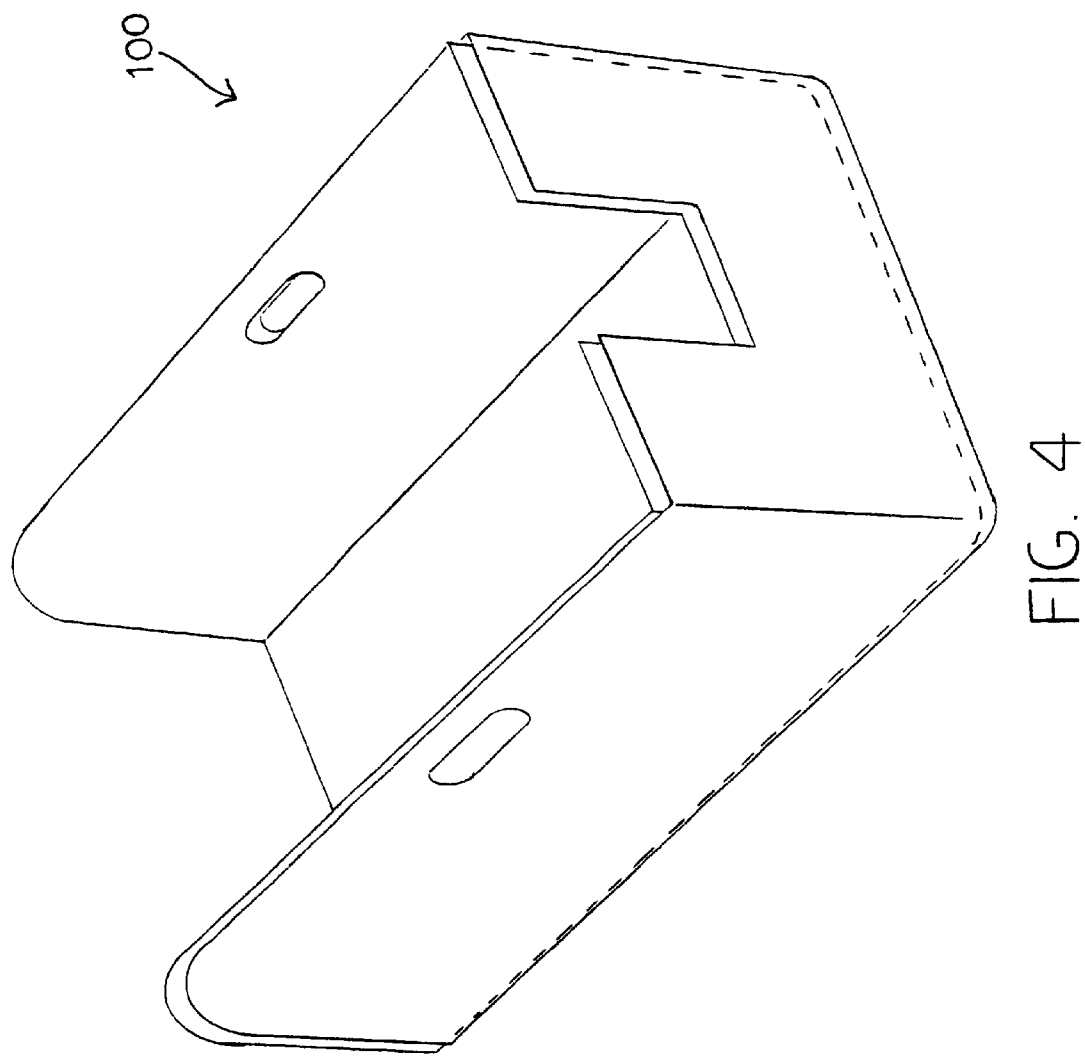
FIG. 4 is a front, perspective view of an embodiment of the present invention having slightly slanted sides, showing the ability to stack multiple units.

The left side piece 60 extends upward from one of the base's longer sides and the right side piece 50 extends upward from the other longer side. The front side piece 20 extends upward from one of the shorter sides of the base. Preferably, the left side 60 and the right side 50 are generally parallel, generally opposing mirror images of one another, and are generally perpendicular to the plane within which the front side 20 rests. The front side 20 is attached to and extends between the left side 60 and the right 50 to form a flat-bottomed box having three upending sides. All of said above sides 40, 50, 60 are generally perpendicular to the base 40, which may include a slight outward slanting, as shown in FIG. 4, to allow multiple units to be stacked inside one another for economy of retail and wholesale space and to cut shipment costs. The invented enclosure 100 preferably does not have a back side wall or a lip or other upward protrusion from the plane of the base 40 near the rear of the enclosure, as such a wall, lip or other protrusion would interfere with removal of the litter box and/or litter from the enclosure. Preferably, the enclosure 100 is of one-piece construction, for reasons of strength and durability, but may be of multiple-piece construction if convenient for manufacturing, shipping, or assembly purposes. The invention preferably does not have a top wall covering the enclosure.

Figure 2:
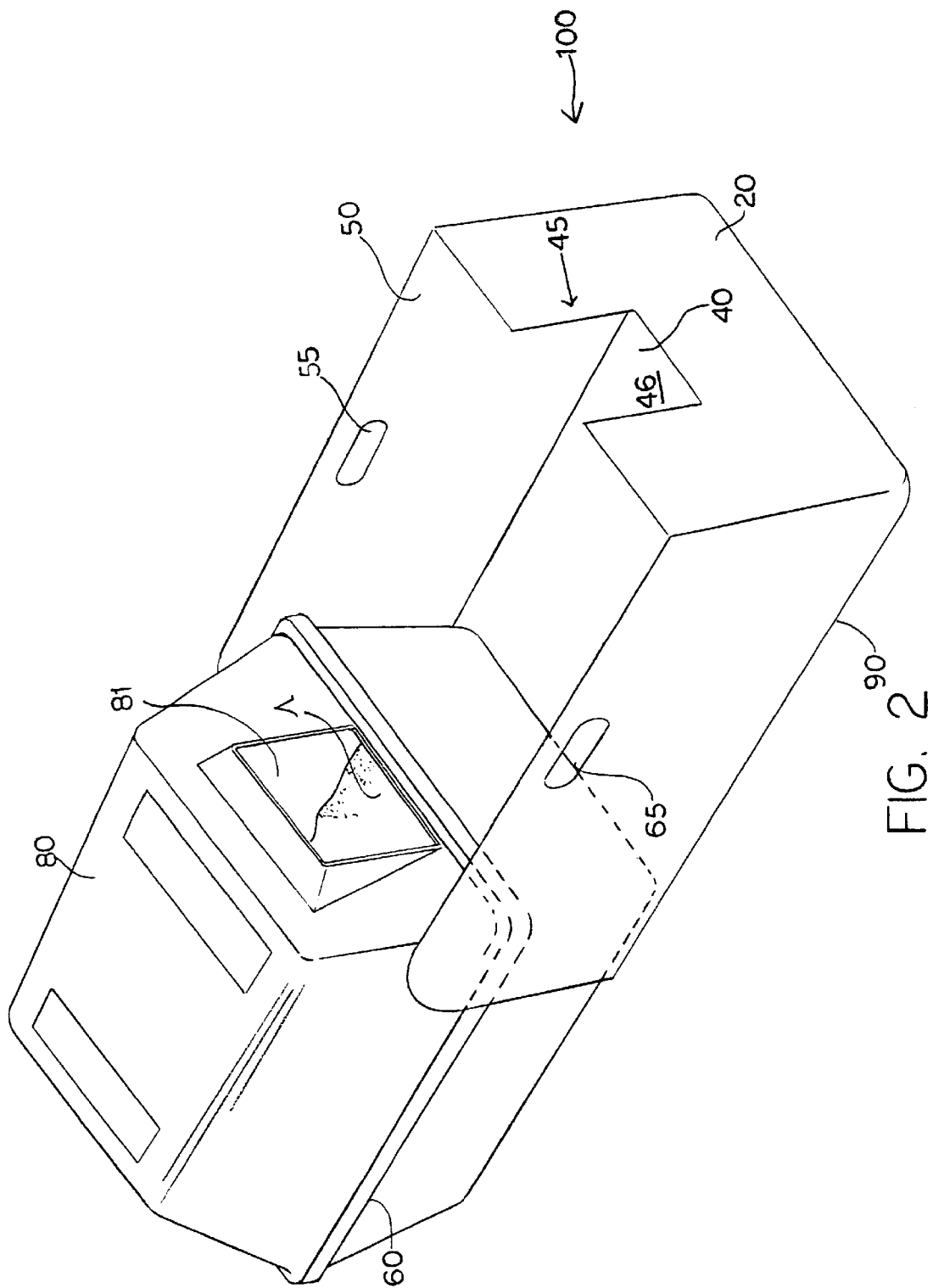
FIG. 2 is a front-left, perspective view of the device of FIG. 1, shown holding a litter box and having the optional scoop caddy.

As shown in FIG. 2, in use, a standard litter box 80 is set within the back portion of the enclosure 100, thereby requiring a cat 70 to step within the enclosure 100 to gain access to the litter box 80. The front of the litter box 80 faces the front side wall 20 of the enclosure 100. The litter box 80 is a separate item and is not necessarily itself considered part of the present invention. The area between the front side of the litter box 80, the base 40, the interior of the front side wall 20, the interior of the left side wall 60 and the interior of the right side wall 50 of the enclosure 100 is called the "tracked litter receptacle" 44.

In the preferred embodiment, the front side 20 has a portal 45 allowing the ingress and egress of a cat 70. In use, the cat 70 steps through the portal 45 and into the tracked litter receptacle 44. The cat 70 then proceeds to take a few steps to the litter box 80, where the cat 70 then steps into the litter box 80. The preferred design has a straight entrance path from the front portal 45 though the receptacle 44, and into the front opening 81 of the litter box, because the front opening 81 and front portal 45 are generally centered on the longitudinal axis of the enclosure between the front end and back end of the enclosure. This way, in the straight-entrance version, there are no turns or labyrinth paths to reach the litter box. In alternative embodiments that include a portal in a side wall, the portal is still close to the front of the enclosure, so that the animal may enter directly to the side of, but still in front of, the cat litter box opening. Having portals in one or more side walls gives the owner more options for placement in a room.

Figure 6:
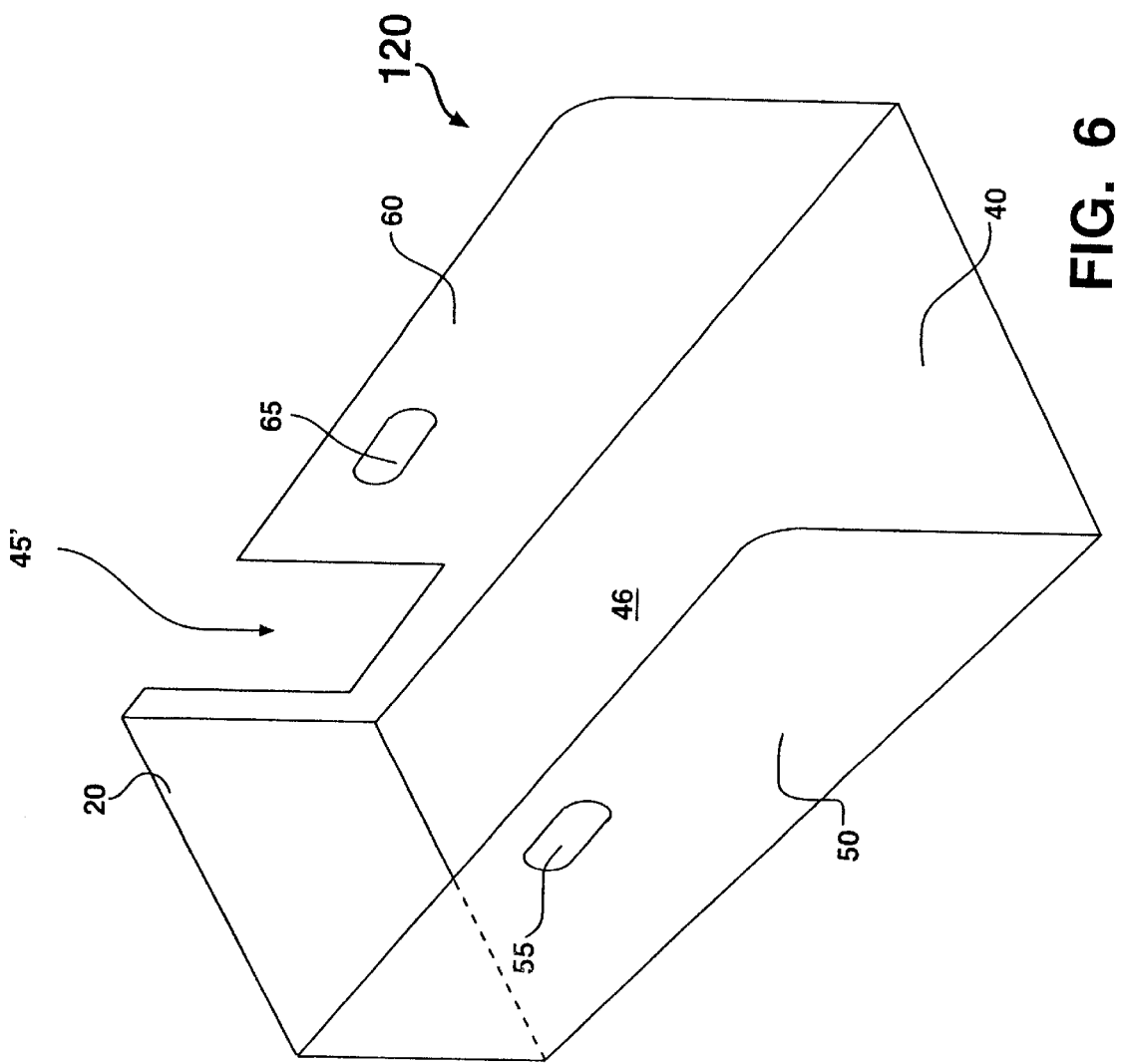
FIG. 6 is a rear, perspective view of another embodiment of the present invention, showing a portal into the enclosure in a side wall near the front of the enclosure.
Figure 7:
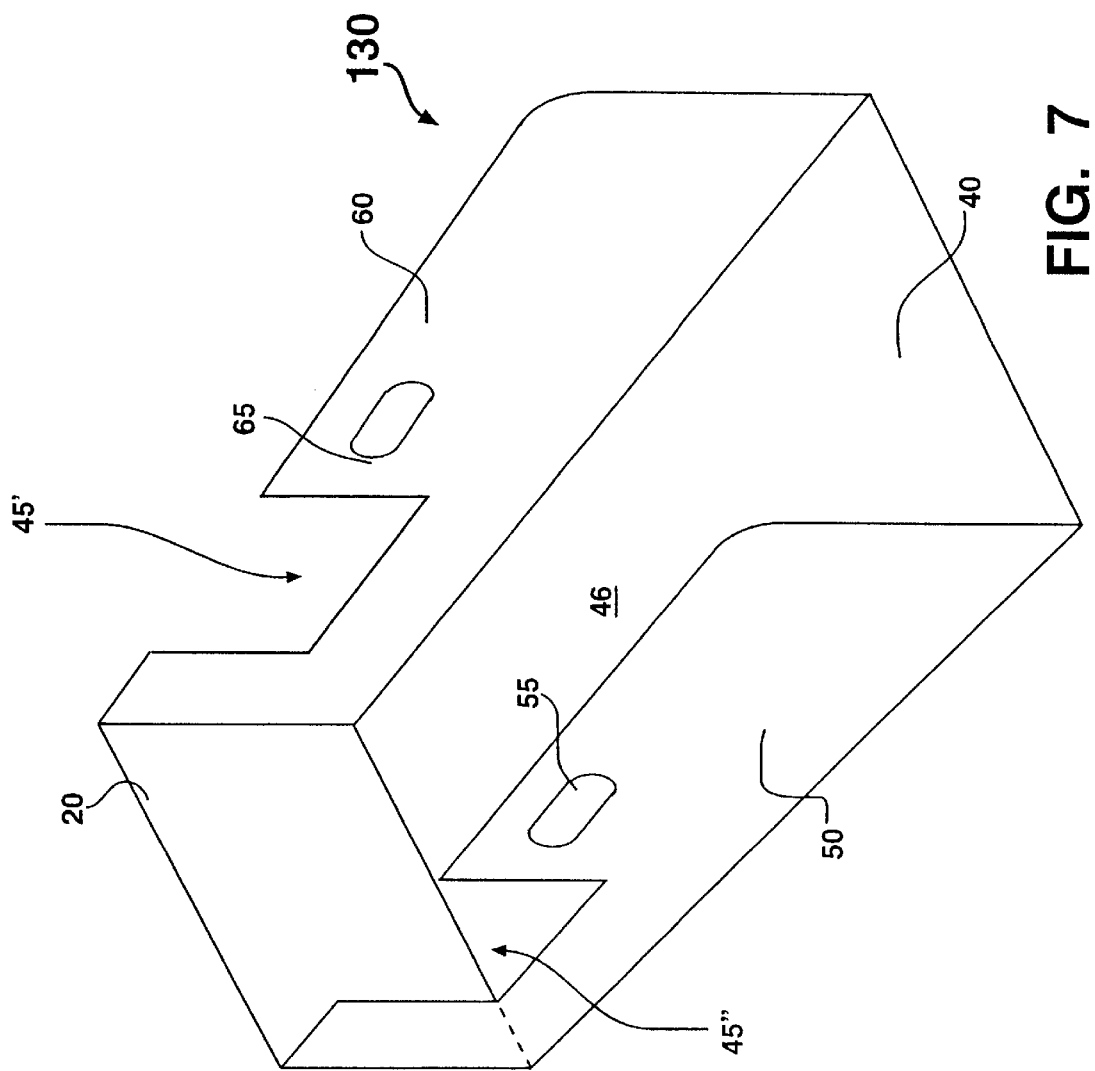
FIG. 7 is a rear, perspective view of another embodiment of the present invention, showing two portals into the enclosure in side walls near the front of the enclosure.

The portal 45 of the enclosure is preferably a three-sided opening, having no top piece or part of the front side wall over it to impede the cat's entry or exit in any way. Preferably, the portal is only wide enough to allow the cat easy entrance and exit. The portal 45 preferably extends downward from the top of the front side wall to a point ½ to ⅔ of the way down the wall so that it is convenient for the cat to enter. The shape of the portal 45 may be varied. Alternatively, the portal 45', 45" could be positioned in a right or left side wall close to the front side wall, as illustrated in the enclosures 120, 130 of FIGS. 6 and 7. Also, alternatively, several portals 45', 45" may be included, as illustrated in FIG. 7. Multiple "punch-out" portals could be created in the enclosure 100, thereby giving the user the option of which portal to "punch-out" and use.

As the cat digs in the litter box 80, cat litter A tossed out of the litter box 80 by the cat 70 is contained within the confines of the tracked litter receptacle 44. Then, upon doing its business in the litter box 80, the cat 70 exits the litter box 80 and steps back within the tracked litter receptacle 44. The cat 70 steps upon the floor surface 46 of the base 40, within the tracked litter receptacle 44. Stepping on the floor surface 46 of the base causes cat litter clinging to the cat's paws 72 to become dislodged. Also, litter flipped off the cat's paws hits the sides and falls to the floor surface 46.

When the cat 70 steps out of the present invention 100 and onto the floor 200 of the room where the litter box 80 is located, much, if not all of the cat litter that was clinging to the cat's paws 72 will remain behind within the confines of the tracked litter receptacle 44. Also, when the pet owner later cleans the litter box 80, the tracked litter receptacle 44 of the present invention serves to contain all particles of cat litter dropped or spilled by the pet owner.

Figure 5:
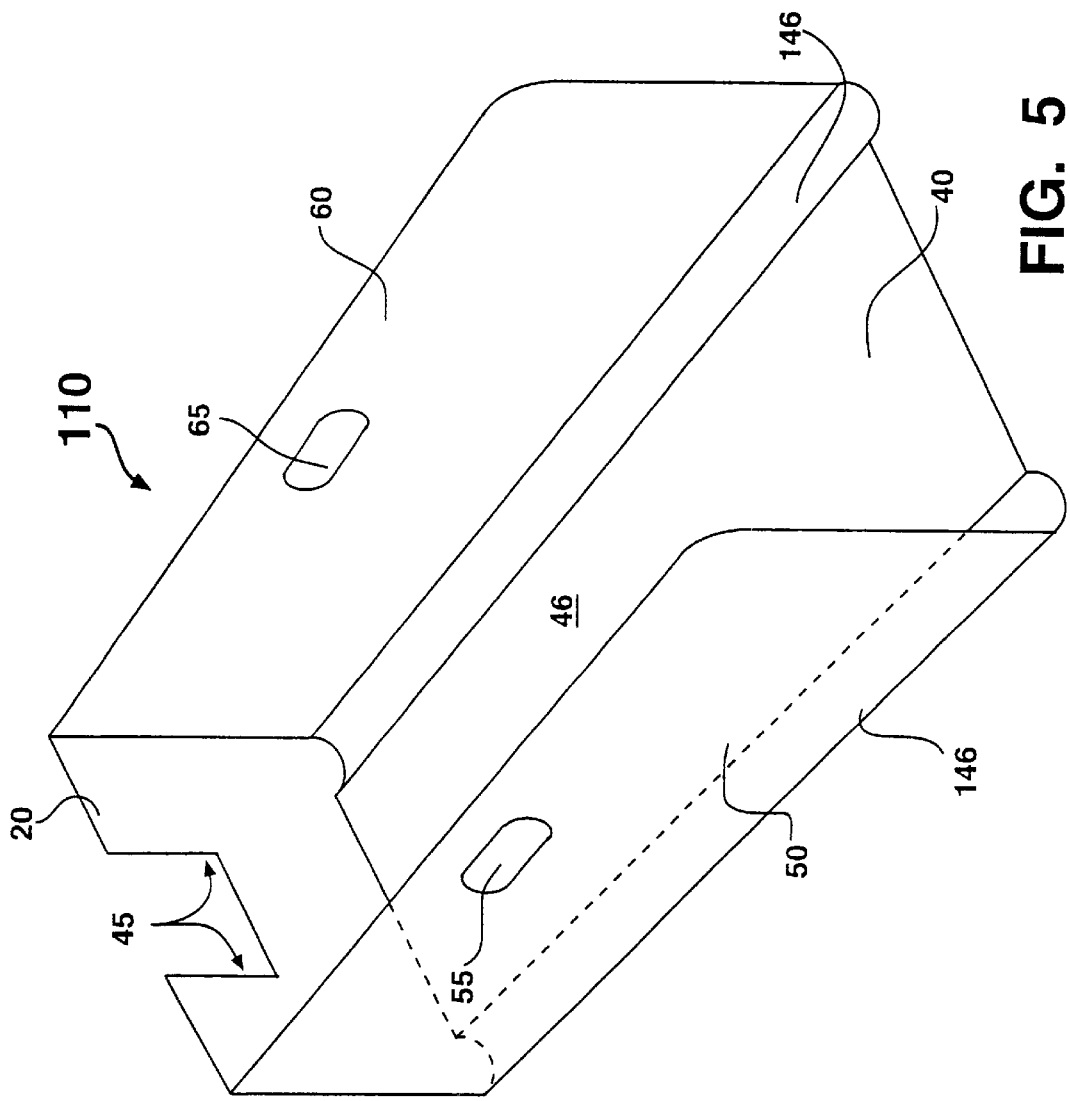
FIG. 5 a rear, perspective view of an alternative embodiment of the present invention having side channels in the floor of the enclosure to assist in emptying the enclosure of tracked litter.

The cleanup of this litter found within the tracked litter receptacle 44 of enclosure 100 is as easy as removing the litter box 80, picking up and tilting the enclosure 100 to one side to cause all of the loose litter particles to congregate together in a pile, typically near one side wall of the enclosure, and then tilting the enclosure 100 to cause this piled litter to pour into a garbage can or back into the litter box 80. As illustrated in the enclosure 110 of FIG. 5, channels 146 or other longitudinal recesses along the side edges of the base may be advantageous to emptying the enclosure. Such channels do not significantly interfere with positioning or removal of the litter box, but they do assist in mess-free handling of the litter. For example, when the owner wishes to empty the enclosure, he/she tilts the enclosure to one side, and the litter will tend to move to that side and fall into the channel on that side. Then the enclosure may be tilted rearward and the litter will travel along the channel to the rear of the enclosure and fall out into the trash can. Such channels, or other recesses preferably extending longitudinally, may be located in the base, if needed for manufacturing reasons, preferably as long as they do not interfere with use and emptying of the enclosure.

Preferably, the sides of the enclosure 100 are tall enough, and close enough to the sides of the litter box to deter the cat 70 from entering into the enclosure 100 any way other than through the portal 45. The portal 45 is intended to be the preferred way into and out of the present invention for the cat 70. Such a height also serves to deflect any cat litter A tossed out of the litter box 80 into the tracked litter receptacle 44 of the enclosure 100. Such a height also serves to discourage the cat from jumping over a side wall into or out of the enclosure 100, thereby encouraging the cat to enter and exit through the portal 45, thus allowing the maximum time and paw steps between the time the cat exists the litter box and until the cat exits the enclosure. Taller enclosure heights can be aesthetically pleasing to screen the litter box 80 from view.

The length of the present enclosure 100 is preferably twenty to twenty-five inches, thus allowing the tracked litter receptacle 44 of the enclosure 100 to be as long as eighteen to twenty-three inches when holding a standard, ~18 inch long litter box.

The litter box 80 is installed in the interior space of the enclosure preferably by one of two preferable methods. The first method is placing the enclosure 100 on the floor 200 and then setting the litter box 80 into the rear portion of the enclosure 100. The second method entails setting the litter box 80 onto the floor 200, setting the enclosure 100 on the floor 200 directly in front of the litter box 80, and then siding the front portion of the litter box 80 into the rear portion of the enclosure 100, or vice versa. With both methods, because the rear portion of the enclosure 100 is open and without an upending wall or lip, it easily accommodates adjustment of the litter box location along the length of the enclosure. Preferably, the length of the enclosure 100 is longer than the length of the litter box 80 contained therein.

The present invention 100 is preferably made of simple, lightweight construction, for example, corrugated cardboard, plastic, corrugated plastic, or other lightweight material may be used. The enclosure 100 may be folded and secured into the preferred shape, molded or otherwise formed. The enclosure may be a pattern cut from a single flat sheet, folded up into the desired shape and taped or otherwise fastened. Preferably, no rough edges are left inside the enclosure that might catch and hold litter.

Figure 8:
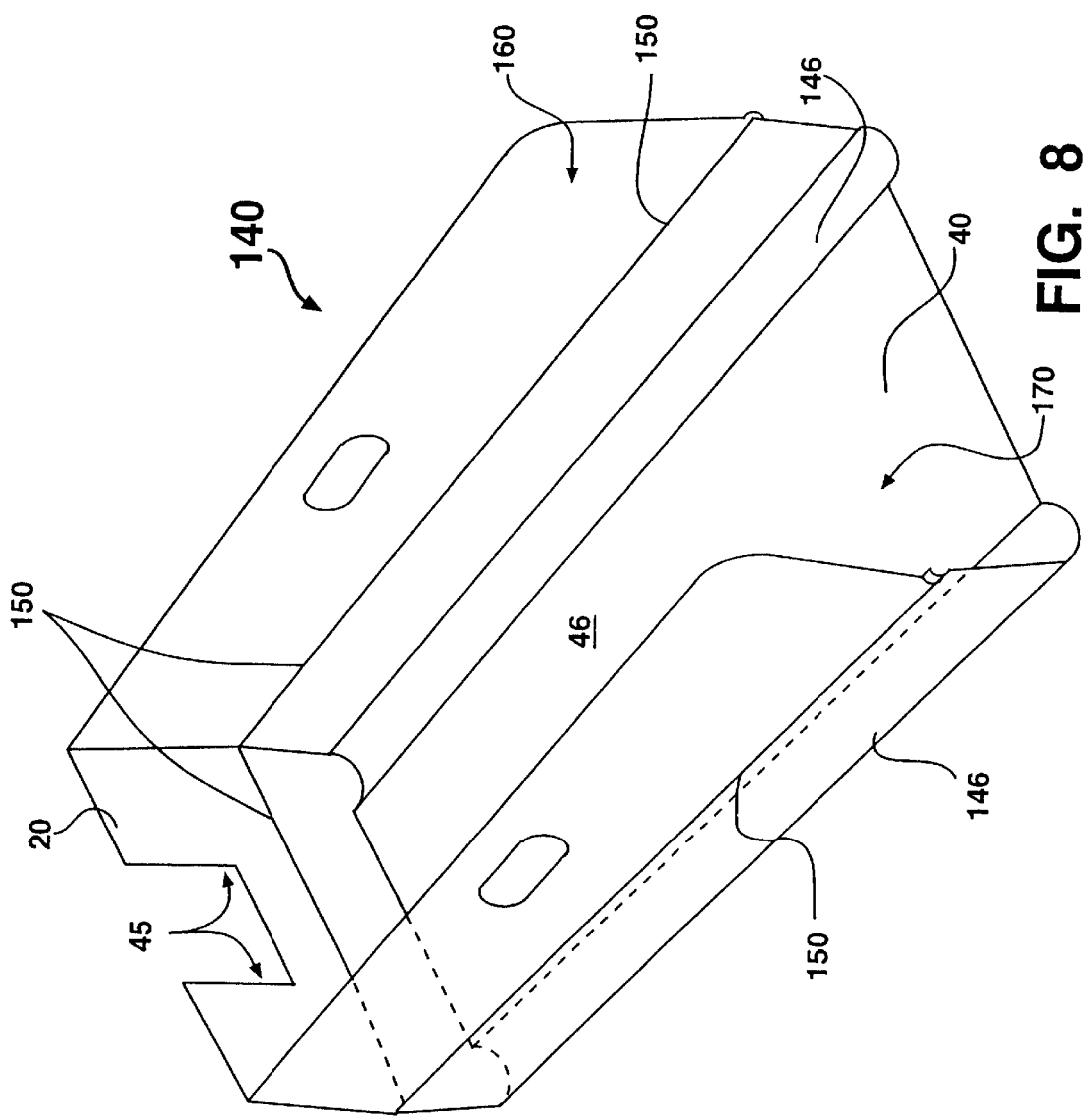
FIG. 8 schematically illustrates another embodiment of the invention enclosure that is a two-piece system that snaps together.

As shown in the enclosure 140 of FIG. 8, there may be seams in the enclosure created by the enclosure being more than one piece during manufacture, transport, or storage. For example, the embodiment in FIG. 8 may have a horizontal seam 150, such as a snap-together or other seam, resulting from the enclosure being made from two generally horizontal pieces, an upper piece 160 and a lower piece 170. The upper piece 160 may be slanted somewhat inward, which results in better stacking when the upper piece 160 is detached from the lower piece 170 and inverted for stacking onto the lower piece.

Figure 3:
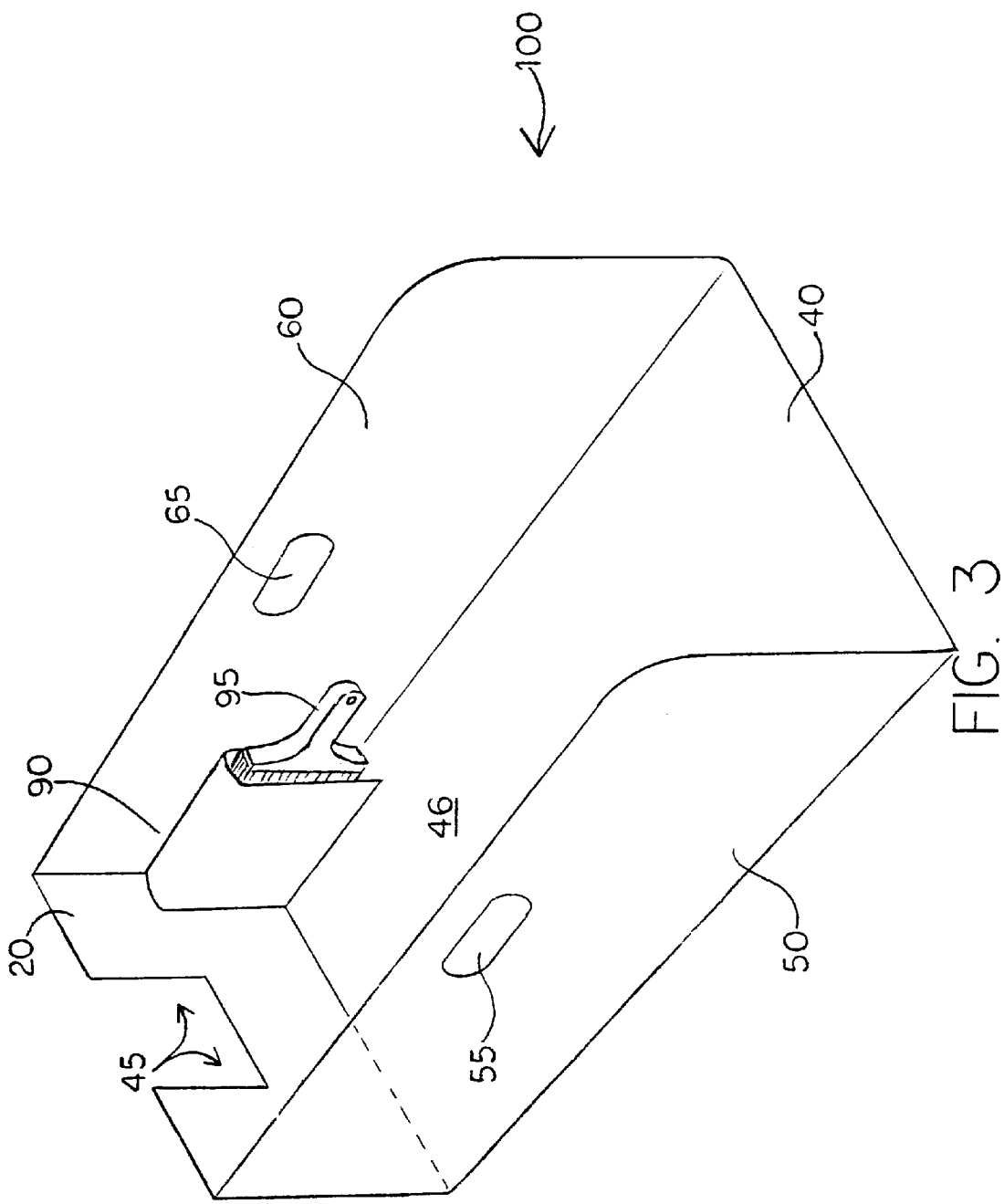
FIG. 3 is a rear-right, perspective view of the device of FIG. 2, shown with the optional scoop caddy.

As shown in FIG. 3, the inventor also envisions the optional use of a scoop caddy 90. This scoop caddy 90 serves as an easily accessible place where the pet owner can store a cat litter scoop 95 out of sight when not in use. This caddy 90 can be located any number of locations on the present invention 100 including on the inside or outside of one of the sides. Shape of this caddy 90 is dependent upon the litter scoop 95 wished to be held.

The preferred caddy 90 has a vertical opening in which to insert the scoop 95. The preferred caddy 90 is affixed to the front right or front left side of the enclosure 100. The preferred opening to the scoop caddy 90 faces the back of the enclosure 100. The solid top wall of the caddy 90 prevents litter from being flipped into the caddy and also hides the scoop 95. The positioning of the caddy 90 as such serves to prevent litter from being trapped between the front wall of the enclosure and the caddy 90 and also allows litter inside (including litter which falls from the scoop 95 while the scoop is not in use) and outside the caddy to slide freely toward the back of the enclosure 100 at cleaning.

The right and left sides 50, 60 of the present invention also preferably contain handles 55, 65 for assisting in the emptying and lifting of the present invention 100. Shown in the Figures is an oblong hole shaped handle 55, 65 cut into the sides 50, 60, however, other types of handles are envisioned as long as the handles allow the enclosure 100 to be easily carried and lifted. The handles are preferably near the center of the length of the enclosure and near the upper surface of the left and right sides 60, 50.

The inventor also envisions the less preferred use of a piece of screening, grating, carpeting or other material (not shown) for assisting in the removal of cat litter from the paws 72 of the cat 70. Such material would cover at least a part of the base 40 of the enclosure, preferably only within the tracked litter receptacle 44, and would serve as a cover of surface 46. Such coverage may leave a left and a right margin for the collection of litter and for assisting in the pouring of the litter out of the enclosure 100. This material may be either fixedly or removably attached within the enclosure, preferably the material is removable for cleaning purposes. However, the use of such material is less preferred because it reduces the ease of pouring litter out of the present invention 100. One preferred material is a lower grade, low density artificial grass.

Although this invention has been described above with reference to particular means, materials and embodiments, it is to be understood that the invention is not limited to these disclosed particulars, but extends instead to all equivalents within the scope of the following claims.

I claim:
1. An enclosure preventing scattered cat litter comprising:
a base;
a front side wall upending from said base;
a left side wall and an opposing right side wall upending from the base and connected to said front side wall;
the enclosure having an interior space receiving a litter box having a front;
the enclosure not having a back wall so that the litter box may slide in and out of the enclosure, toward and away from the front wall respectively;
the enclosure further having a tracked litter receptacle, said receptacle defined by the area within the enclosure between the front of the litter box, the base, the front side wall, the left side wall and the right side wall and
the enclosure further having a portal at or near the front side wall for easy ingress and egress by a cat into and out of said tracked litter receptacle.

2. An enclosure, as in claim 1, wherein said portal is in the front side wall.

3. An enclosure, as in claim 1, wherein said portal is in the left side wall near the front side wall.

4. An enclosure, as in claim 1, wherein said portal is in the right side wall near the front side wall.

5. An enclosure, as in claim 1, comprising two portals at or near the front side wall.

6. An enclosure, as in claim 1, wherein the enclosure base has a rear edge opposite the front side wall, and a longitudinal dimension between the front side wall and the rear of the base, and the base comprises a longitudinal recess.

7. An enclosure, as in claim 6, wherein the longitudinal recess is near one of either said right side wall or left side wall.

8. An enclosure, as in claim 6, comprising two longitudinal recesses near the right side wall and the left side wall.

9. An enclosure, as in claim 1, that does not have a top wall covering said enclosure.

10. An enclosure, as in claim 1 that is not attached to said litter box.

11. An enclosure, as in claim 1, wherein said tracked litter receptacle is adapted to collect therein tracked cat litter tracked out of a litter box by a cat exiting from said litter box.

12. An enclosure, as in claim 1, wherein said left side wall and said right side wall contain handles for assisting in the lifting of the apparatus.

13. An enclosure, as in claim 1, wherein said enclosure further comprises a scoop caddy for the holding of a cat litter scoop.

14. An enclosure, as in claim 1, wherein said front side, said left side and said right side are slightly slanted for allowing multiple units to be stacked inside one another.

15. An enclosure, as in claim 1, wherein said base is covered with a grating material for assisting in the removal of cat litter from the paws of cats.

16. An enclosure, as in claim 1, wherein said base is covered with a carpeting material for assisting in the removal of cat litter from the paws of cats.

17. An enclosure, as in claim 1, wherein the litter box has a front opening, and the portal and the front opening are centered on a longitudinal axis of the enclosure.

18. An enclosure for receiving a cat litter box, the enclosure comprising:
a base for resting on a generally horizontal surface;
three walls upending from the base on three sides of the base and defining an interior space, and a fourth side of the enclosure being open for slidably and horizontally receiving a cat litter box into the interior space;
wherein the three walls comprise a front wall and two side walls upending from the base on three sides of the base,
wherein the front wall and the two side walls are adapted to surround the cat litter box on three sides with a cat litter box opening facing into the interior space and spaced from the front wall;
a tracked litter receptacle area within the interior space between the opening of the litter box and the front wall for receiving litter spread and tracked from the cat litter box;
a portal in one of the three walls for allowing an animal to enter the tracked litter receptacle area and the cat litter box opening.

* * * * *